US012646647B2

(12) United States Patent
Miura et al.

(10) Patent No.: US 12,646,647 B2
(45) Date of Patent: Jun. 2, 2026

(54) COIL COMPONENT

(71) Applicant: TDK Corporation, Tokyo (JP)

(72) Inventors: Mitsuru Miura, Tokyo (JP); Toshiyuki Abe, Tokyo (JP); Tomonaga Nishikawa, Tokyo (JP); Masaki Endo, Tokyo (JP); Masaki Yoneyama, Tokyo (JP)

(73) Assignee: TDK Corporation, Tokyo (JP)

( * ) Notice: Subject to any disclaimer, the term of this patent is extended or adjusted under 35 U.S.C. 154(b) by 732 days.

(21) Appl. No.: 18/180,510

(22) Filed: Mar. 8, 2023

(65) Prior Publication Data

US 2023/0317358 A1 Oct. 5, 2023

(30) Foreign Application Priority Data

Mar. 30, 2022 (JP) ................................ 2022-056999

(51) Int. Cl.
*H01F 27/30* (2006.01)
*H01F 27/02* (2006.01)
*H01F 27/29* (2006.01)
*H01F 27/32* (2006.01)

(52) U.S. Cl.
CPC .......... *H01F 27/292* (2013.01); *H01F 27/02* (2013.01); *H01F 27/32* (2013.01)

(58) Field of Classification Search
CPC ................................................ H01F 27/292
USPC ................................ 336/199, 200, 221, 232
See application file for complete search history.

(56) References Cited

U.S. PATENT DOCUMENTS 10,304,614 B2 * 5/2019 Yu ........................ H01F 27/2804
11,424,065 B2 * 8/2022 Yoon ........................ H01F 17/04
11,776,734 B2 * 10/2023 Sato ........................ H01F 27/29 336/200
2002/0008301 A1 * 1/2002 Liou ...................... H10D 84/00 257/E21.022
2003/0098496 A1 * 5/2003 Sugiyama ............. H01F 41/045 257/516
2014/0292466 A1 * 10/2014 Watanabe ............... H01F 27/29 205/118
2016/0379746 A1 * 12/2016 Yoshioka ............ H01F 27/2823 336/220
2017/0098997 A1 * 4/2017 Hamada .............. H01F 17/0013
2017/0140866 A1 * 5/2017 Hong ...................... H01F 41/10

(Continued)

FOREIGN PATENT DOCUMENTS

JP 2020-088330 A 6/2020

*Primary Examiner* — Ronald Hinson
(74) *Attorney, Agent, or Firm* — Rimon P.C.

(57) ABSTRACT

Disclosed herein is a coil component that includes a conductor layer including a coil pattern and a terminal pattern provided independently of the coil pattern and exposed from the magnetic element body. The terminal pattern includes a linear part having a substantially constant pattern width in a direction perpendicular to the side surface of the magnetic element body, a widened part positioned at one end side in a second direction. The outermost turn of the coil pattern includes a first section provided along the linear part, a second section provided along the widened part, and a fourth section provided along the magnetic element body and positioned on a side opposite to the first section with respect to the second section. The pattern width of the coil pattern is larger in the second sections than in the first and fourth sections.

6 Claims, 3 Drawing Sheets

(56) References Cited

U.S. PATENT DOCUMENTS

| | | | | |
|---|---|---|---|---|
| 2018/0122548 | A1* | 5/2018 | Kim | H01F 27/24 |
| 2018/0122556 | A1* | 5/2018 | Kim | H01F 41/041 |
| 2018/0323003 | A1* | 11/2018 | Fujii | H01F 27/2804 |

* cited by examiner

COIL COMPONENT

BACKGROUND OF THE ART

Field of the Art

The present disclosure relates to a coil component and, more particularly, to a coil component having a structure in which a plurality of interlayer insulating films and a plurality of conductor layers are alternately stacked.

Description of Related Art

JP 2020-088330A discloses a coil component having a structure in which a plurality of interlayer insulating films and a plurality of conductor layers are alternately stacked. In the coil component described in JP 2020-088330A, two terminal electrodes are arranged in the stacking direction of the plurality of conductor layers, one of which is connected to one end of a coil pattern positioned in the lowermost layer, and the other one of which is connected to one end of a coil pattern positioned in the uppermost layer.

In the coil component described in JP 2020-088330A, the coil pattern has a substantially constant width.

SUMMARY

It is therefore an object of the present disclosure to reduce a DC resistance by locally enlarging the width of a coil pattern.

A coil component according to the present disclosure includes: a coil part in which a plurality of interlayer insulating films and a plurality of conductor layers are alternately stacked; first and second terminal electrodes; and a magnetic element body in which the coil part and first and second terminal electrodes are embedded. The plurality of conductor layers include a first conductor layer positioned in the lowermost layer and a second conductor layer positioned in the uppermost layer. The first conductor layer includes a first coil pattern and a first terminal pattern provided independently of the first coil pattern and exposed from a first side surface of the magnetic element body. The second conductor layer includes a second coil pattern and a second terminal pattern provided independently of the second coil pattern and exposed from a second side surface of the magnetic element body that is positioned on the side opposite to the first side surface. The first terminal electrode is connected to one end of the first coil pattern through the second terminal pattern, and the second terminal electrode is connected to one end of the second coil pattern. The first terminal pattern includes a first linear part having a substantially constant pattern width in a first direction perpendicular to the first side surface of the magnetic element body, a first widened part positioned at one end side in a second direction along the first side surface of the magnetic element body and having a pattern width in the first direction larger than that of the first linear part, and a second widened part positioned at the other end side in the second direction and having a larger pattern width in the first direction than that of the first linear part. The outermost turn of the first coil pattern includes a first section provided along the first linear part of the first terminal pattern, a second section provided along the first widened part of the first terminal pattern, a third section provided along the second widened part of the first terminal pattern, a fourth section provided along the magnetic element body and positioned on the side opposite to the first section with respect to the second section, and a fifth section provided along the magnetic element body and positioned on the side opposite to the first section with respect to the third section. The pattern width of the first coil pattern is larger in the second and third sections than in the first, fourth, and fifth sections.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

Preferred embodiments of the present disclosure will be explained below in detail with reference to the accompanying drawings.

Figure 1:
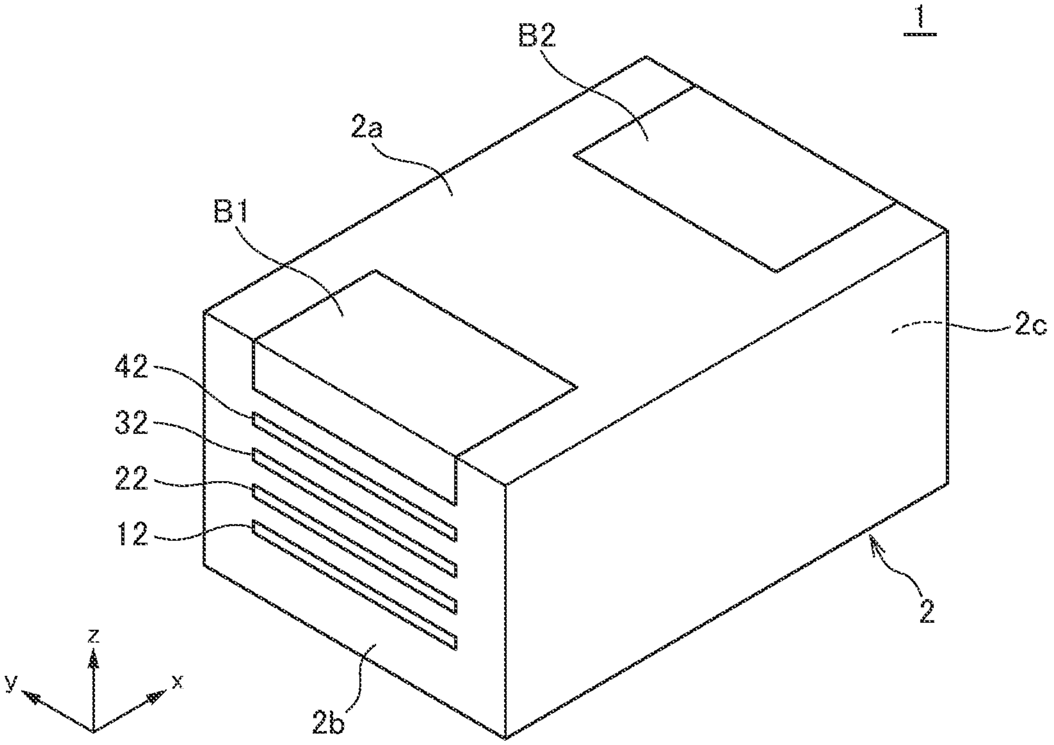
FIG. 1 is a schematic perspective view illustrating the outer appearance of a coil component 1 according to an embodiment of the present disclosure.
Figure 2:
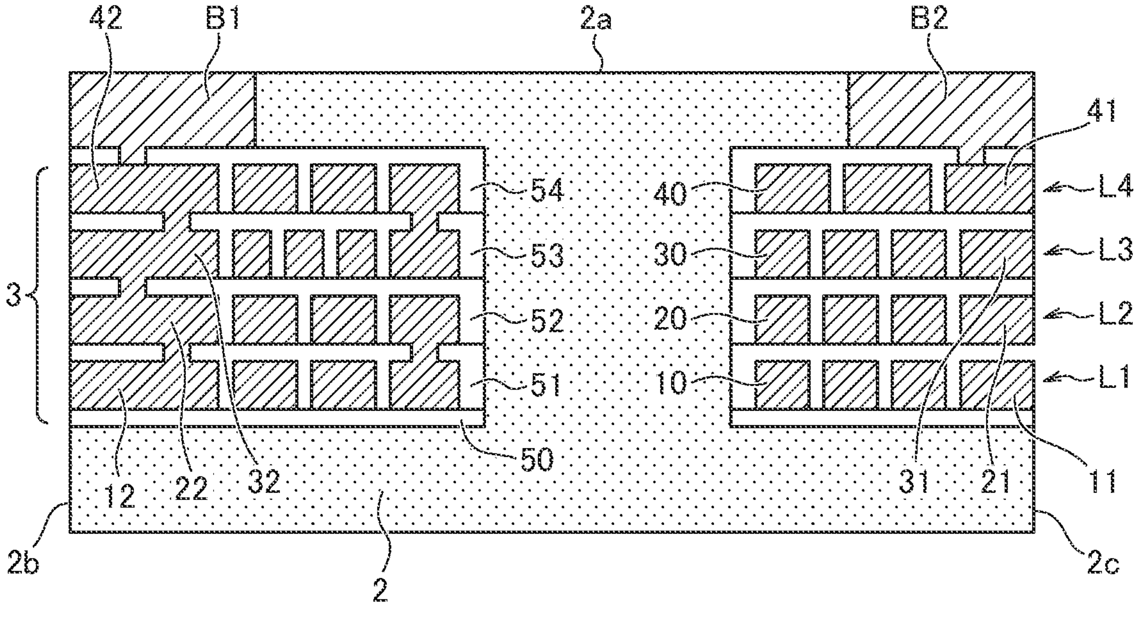
FIG. 2 is a schematic cross-sectional view of the coil component 1.

FIG. 1 is a schematic perspective view illustrating the outer appearance of a coil component 1 according to an embodiment of the present disclosure. FIG. 2 is a schematic cross-sectional view of the coil component 1.

As illustrated in FIGS. 1 and 2, the coil component 1 according to the present embodiment includes a magnetic element body 2, a coil part 3, and bump terminal electrodes B1 and B2. The coil part 3 and bump terminal electrodes B1 and B2 are embedded in the magnetic element body 2. The magnetic element body 2 is positioned in the inner diameter area and outside area of the coil part 3 so as to sandwich the coil part 3 in the z-direction (coil axis direction). The magnetic element body 2 is a composite magnetic member containing magnetic metal filler made of iron (Fe) or a permalloy-based material and a resin binder and forms a magnetic path for magnetic flux generated by making a current flow in the coil part 3. The magnetic element body 2 has an upper surface 2*a* constituting the xy plane which is perpendicular to the z-direction (coil axis direction) and a pair of side surfaces 2*b* and 2*c* constituting the yz plane which is perpendicular to the upper surface 2*a*. The side surfaces 2*b* and 2*c* are positioned on the opposite sides. The surface of the terminal electrode B1 is exposed from the upper surface 2*a* and side surface 2*b* of the magnetic element body 2. The surface of the terminal electrode B2 is exposed from the upper surface 2*a* and side surface 2*c* of the magnetic element body 2. Upon mounting of the coil component 1, the terminal electrodes B1 and B2 are soldered onto a circuit board such that the upper surface 2*a* of the magnetic element body 2 faces the circuit board.

The coil part 3 includes interlayer insulating films 50 to 54 and conductor layers L1 to L4 which are alternately stacked in the coil axis direction. The conductor layers L1 to L4 have coils patterns 10, 20, 30, and 40, respectively.

FIGS. 3 to 6 are plan views illustrating the pattern shapes of the conductor layers L1 to L4, respectively.

Figure 3:
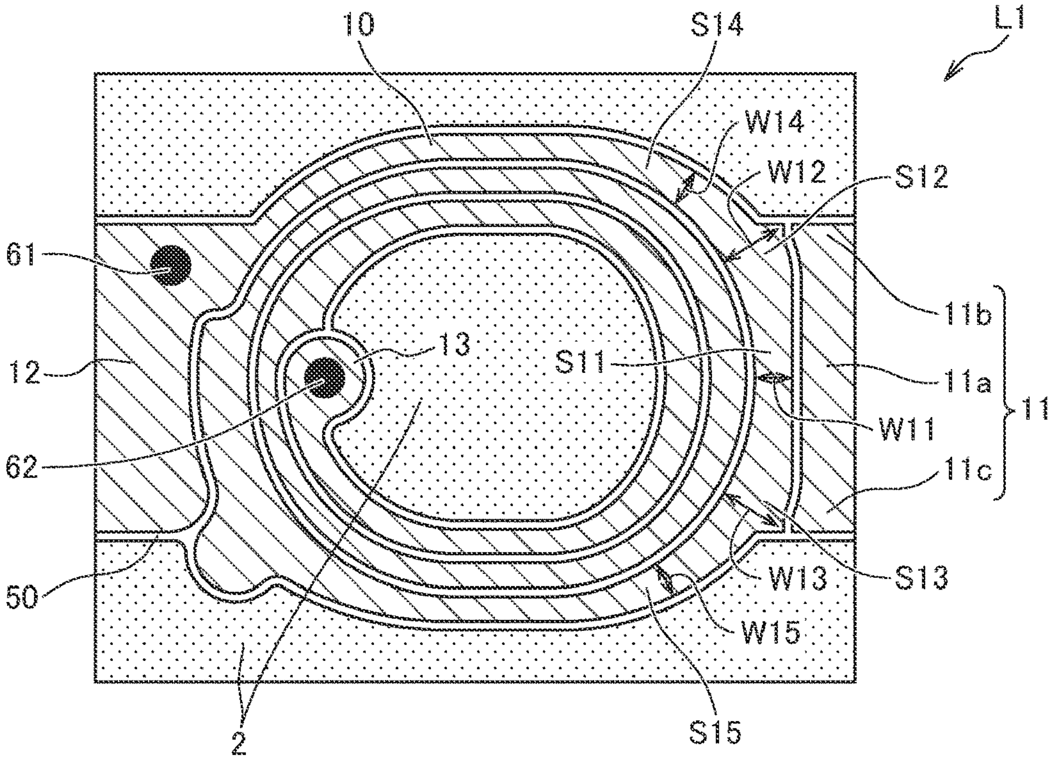
FIG. 3 is a plan view illustrating the pattern shape of the conductor layer L1.

As illustrated in FIG. 3, the conductor layer L1 is formed on the surface of the interlayer insulating film 50 and includes the coil pattern 10 and a terminal pattern 11. An outer peripheral end 12 of the coil pattern 10 has an enlarged area and overlaps the terminal electrode B1 as viewed in the z-direction. The terminal pattern 11 is separated from the coil pattern 10 within the surface and overlaps the terminal electrode B2 as viewed in the z-direction. The terminal pattern 11 includes a linear part 11*a*, a widened part 11*b*, and a widened part 11*c*. The linear part 11*a* has a substantially constant pattern width in the x-direction. The widened parts 11*b* and 11*c* are positioned respectively at one end side and the other end side in the y-direction and each have a pattern width in the x-direction larger than that of the linear part 11*a*. The widened parts 11*b* and 11*c* have a shape in which the pattern width thereof in the x-direction increases toward the end portion in the y-direction. Accordingly, the edge of each of the widened parts 11*b* and 11*c* that is positioned on the side opposite to the side surface 2*c* of the magnetic element body 2 extends obliquely with respect to the y-direction. On the other hand, the edge of the linear part 11*a* that is positioned on the side opposite to the side surface 2*c* of the magnetic element body 2 extends substantially linearly in the y-direction.

The outermost turn of the coil pattern 10 includes a section S11 extending in substantially the y-direction along the linear part 11*a* of the terminal pattern 11, a section S12 provided along the widened part 11*b* of the terminal pattern 11, a section S13 provided along the widened part 11*c* of the terminal pattern 11, a section S14 provided along the magnetic element body 2 and positioned on the side opposite to the section S11 with respect to the section S12, and a section S15 provided along the magnetic element body 2 and positioned on the side opposite to the section S11 with respect to the section S13. The section S14 is positioned closer to the outer peripheral end 12 than the section S12 and includes a part extending in the x-direction. The section S15 is positioned closer to an inner peripheral end 13 than the section S13 and includes a part extending in the x-direction. The thus configured conductor layer L1 is covered with the interlayer insulating film 51.

As illustrated in FIG. 3, the pattern width of the coil pattern 10 in the radial direction is not constant, but pattern widths W12 and W13 of the respective sections S12 and S13 are larger than pattern widths W11, W14, and W15 of the respective sections S11, S14, and S15. That is, the outermost turn of the coil pattern 10 radially protrudes outward between the sections S11 and S14 and between the sections S11 and S15.

The outer peripheral edges of the respective sections S11 to S13 of the coil pattern 10 extend along the terminal pattern 11 through the interlayer insulating film 51. Thus, the outer peripheral edge of the section S11 extends substantially linearly in the y-direction with the result that the pattern width W11 of the section S11 increases toward the sections S12 and S13 from the center in the y-direction. The outer peripheral edges of the respective sections S12 and S13 each have a part extending in the x-direction. Thus, an increase in the pattern width per unit peripheral length from the section S14 toward the section S12 and an increase in the pattern width per unit peripheral length from the section S15 toward the section S13 are larger than an increase in the pattern width per unit peripheral length from the section S11 toward the sections S12 and S13.

Figure 4:
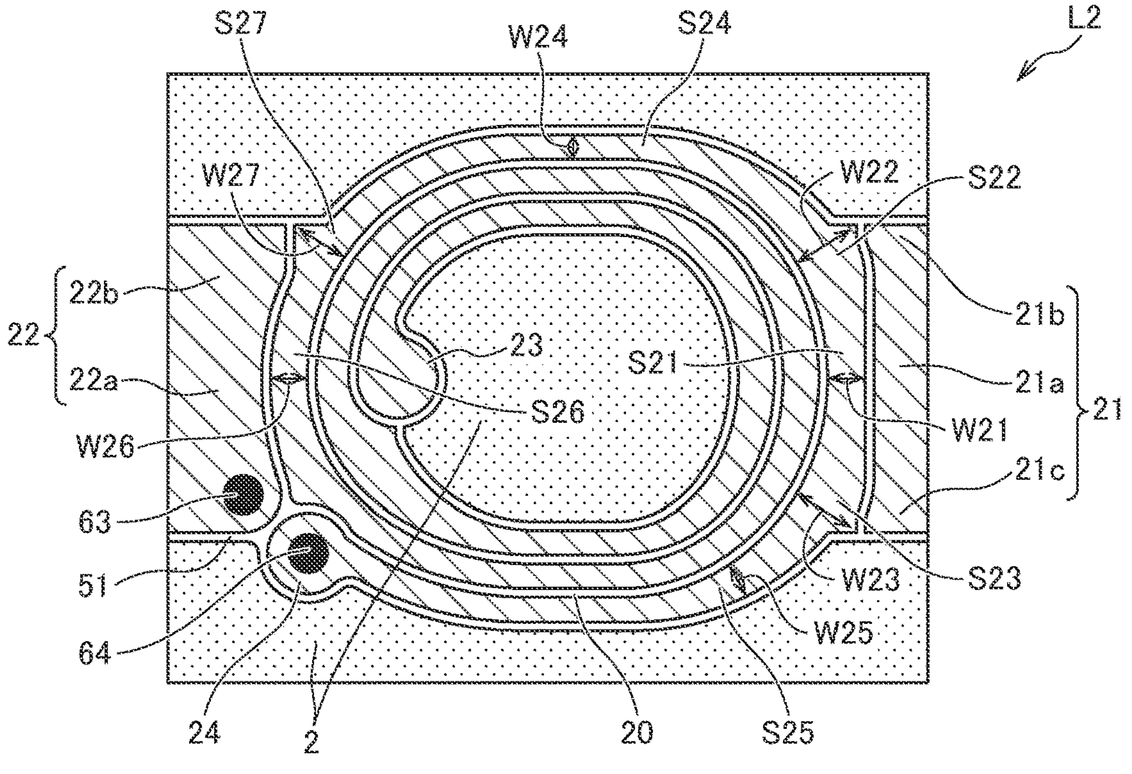
FIG. 4 is a plan view illustrating the pattern shape of the conductor layer L2.

As illustrated in FIG. 4, the conductor layer L2 is formed on the surface of the interlayer insulating film 51 and includes the coil pattern 20 and the terminal patterns 21 and 22. The terminal patterns 21 and 22 are separated from the coil pattern 20 within the surface and overlap respectively the terminal electrodes B2 and B1 as viewed in the z-direction. The terminal pattern 22 is connected to the outer peripheral end 12 of the coil pattern 10 through a via conductor 61 penetrating the interlayer insulating film 51. An inner peripheral end 23 of the coil pattern 20 is connected to the inner peripheral end 13 of the coil pattern 10 through a via conductor 62 penetrating the interlayer insulating film 51.

The terminal pattern 21 has the same shape as the terminal pattern 11 included in the conductor layer L1. That is, the terminal pattern 21 includes a linear part 21*a* having a substantially constant pattern width in the x-direction and widened parts 21*b* and 21*c* positioned respectively at one end side and the other end side in the y-direction and each have a pattern width in the x-direction larger than that of the linear part 21*a*. The widened parts 21*b* and 21*c* have a shape in which the pattern width thereof in the x-direction increases toward the end portion in the y-direction. Accordingly, the edge of each of the widened parts 21*b* and 21*c* that is positioned on the side opposite to the side surface 2*c* of the magnetic element body 2 extends obliquely with respect to the y-direction. On the other hand, the edge of the linear part 21*a* that is positioned on the side opposite to the side surface 2*c* of the magnetic element body 2 extends substantially linearly in the y-direction.

The terminal pattern 22 includes a nonlinear part 22*a* whose pattern width in the x-direction increases with distance from the center portion in the y-direction and a linear part 22*b* positioned at one end side in the y-direction and having a substantially constant pattern width in the x-direction. The edge of the nonlinear part 22*a* positioned on the side opposite to the side surface 2*b* of the magnetic element body 2 has a circular-arc shape. On the other hand, the edge of the linear part 22*b* positioned on the side opposite to the side surface 2*b* of the magnetic element body 2 extends substantially linearly in the y-direction.

The outermost turn of the coil pattern 20 includes a section S21 extending in substantially the y-direction along the linear part 21*a* of the terminal pattern 21, a section S22 provided along the widened part 21*b* of the terminal pattern 21, a section S23 provided along the widened part 21*c* of the terminal pattern 21, a section S24 provided along the magnetic element body 2 and positioned on the side opposite to the section S21 with respect to the section S22, a section S25 provided along the magnetic element body 2 and positioned on the side opposite to the section S21 with respect to the section S23, a section 26 provided along the nonlinear part 22*a* of the terminal pattern 22, and a section S27 provided along the linear part 22*b* of the terminal pattern 22. The section S24 is positioned between the section S22 and the section S27 and includes a part extending in the x-direction. The section S25 is positioned closer to an outer peripheral end 24 than the section S23 and includes a part extending in the x-direction. The thus configured conductor layer L2 is covered with the interlayer insulating film 52.

As illustrated in FIG. 4, the pattern width of the coil pattern 20 in the radial direction is not constant, but pattern widths W22 and W23 of the respective sections S22 and S23 are larger than pattern widths W21, W24, and W25 of the respective sections S21, S24, and S25, and a pattern width W27 of the section S27 is larger than the pattern widths W24 and W26 of the respective sections S24 and S26. That is, the outermost turn of the coil pattern radially protrudes outward between the sections S21 and S25 and between the sections S26 and S24.

The outer peripheral edges of the respective sections S21 to S23 of the coil pattern 20 extend along the terminal pattern 21 through the interlayer insulating film 52. Thus, the outer peripheral edge of the section S21 extends substantially linearly in the y-direction with the result that the pattern width W21 of the section S21 increases toward the sections S22 and S23 from the center in the y-direction. The outer peripheral edges of the respective sections S22 and S23 each have a part extending in the x-direction. Thus, an increase in the pattern width per unit peripheral length from the section S24 toward the section S22 and an increase in the pattern width per unit peripheral length from the section S25 toward the section S23 are larger than an increase in the pattern width per unit peripheral length from the section S21 toward the sections S22 and S23. Similarly, the outer peripheral edge of the section 27 has a part extending in the x-direction. Thus, an increase in the pattern width per unit peripheral length from the section S24 toward the section S27 is larger than an increase in the pattern width per unit peripheral length from the section S26 toward the section S27.

Figure 5:
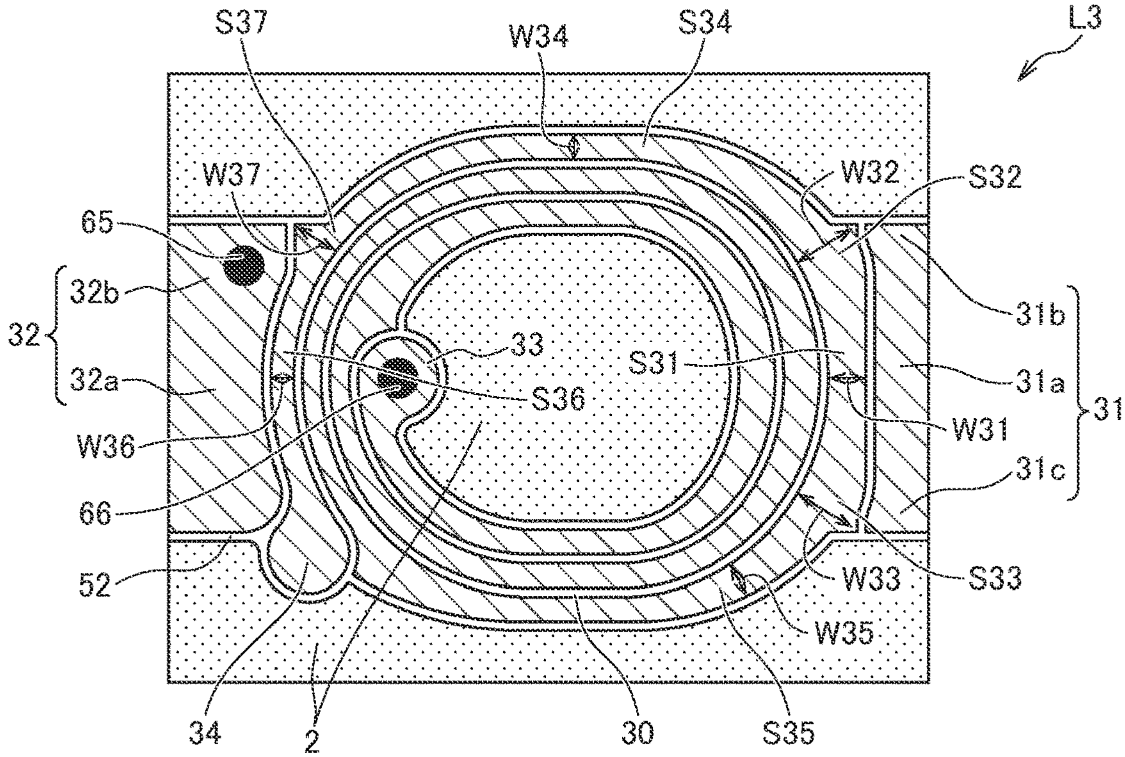
FIG. 5 is a plan view illustrating the pattern shape of the conductor layer L3.

As illustrated in FIG. 5, the conductor layer L3 is formed on the surface of the interlayer insulating film 52 and includes the coil pattern 30 and terminal patterns 31 and 32. The terminal patterns 31 and 32 are separated from the coil pattern 30 within the surface and overlap respectively the terminal electrodes B2 and B1 as viewed in the z-direction. The terminal pattern 32 is connected to the terminal pattern 22 of the conductor layer L2 through a via conductor 63 penetrating the interlayer insulating film 52. The planar position of the via conductor 63 differs from the planar position of the via conductor 61, thereby preventing a recess of the conductor layer caused due to stacking of the via conductors. Further, an outer peripheral end 34 of the coil pattern 30 is connected to the outer peripheral end 24 of the coil pattern 20 through a via conductor 64 penetrating the interlayer insulating film 52.

The terminal pattern 31 has the same shape as those of the terminal patterns 11 and 21 included respectively in the conductor layers L1 and L2. That is, the terminal pattern 31 includes a linear part 31*a* having a substantially constant pattern width in the x-direction and widened parts 31*b* and 31*c* positioned respectively at one end side and the other end side in the y-direction and each have a pattern width in the x-direction larger than that of the linear part 31*a*. The widened parts 31*b* and 31*c* have a shape in which the pattern width thereof in the x-direction increases toward the end portion in the y-direction. Accordingly, the edge of each of the widened parts 31*b* and 31*c* that is positioned on the side opposite to the side surface 2*c* of the magnetic element body 2 extends obliquely with respect to the y-direction. On the other hand, the edge of the linear part 31*a* that is positioned on the side opposite to the side surface 2*c* of the magnetic element body 2 extends substantially linearly in the y-direction.

The terminal pattern 32 has the same shape as the terminal pattern 22 included in the conductor layer L2. That is, the terminal pattern 32 includes a nonlinear part 32*a* whose pattern width in the x-direction increases with distance from the center portion in the y-direction and a linear part 32*b* positioned at one end side in the y-direction and having a substantially constant pattern width in the x-direction. The edge of the nonlinear part 32*a* positioned on the side opposite to the side surface 2*b* of the magnetic element body 2 has a circular-arc shape. On the other hand, the edge of the linear part 32*b* positioned on the side opposite to the side surface 2*b* of the magnetic element body 2 extends substantially linearly in the y-direction.

The outermost turn of the coil pattern 30 includes a section S31 extending in substantially the y-direction along the linear part 31*a* of the terminal pattern 31, a section S32 provided along the widened part 31*b* of the terminal pattern 31, a section S33 provided along the widened part 31*c* of the terminal pattern 31, a section S34 provided along the magnetic element body 2 and positioned on the side opposite to the section S31 with respect to the section S32, a section S35 provided along the magnetic element body 2 and positioned on the side opposite to the section S31 with respect to the section S33, a section S36 provided along the nonlinear part 32*a* of the terminal pattern 32, and a section S37 provided along the linear part 32*b* of the terminal pattern 32. The section S34 is positioned between the section S32 and the section S37 and includes a part extending in the x-direction. The section S35 is positioned closer to an inner peripheral end 33 than the section S33 and includes a part extending in the x-direction. The thus configured conductor layer L3 is covered with the interlayer insulating film 53.

As illustrated in FIG. 5, the pattern width of the coil pattern 30 in the radial direction is not constant, but pattern widths W32 and W33 of the respective sections S32 and S33 are larger than pattern widths W31, W34, and W35 of the respective sections S31, S34, and S35, and a pattern width W37 of the section S37 is larger than the pattern widths W34 and W36 of the respective sections S34 and S36. That is, the outermost turn of the coil pattern 30 radially protrudes outward between the sections S31 and S34, between the sections S31 and S35 and between the sections S36 and S34.

The outer peripheral edges of the respective sections S31 to S33 of the coil pattern 30 extend along the terminal pattern 31 through the interlayer insulating film 53. Thus, the outer peripheral edge of the section S31 extends substantially linearly in the y-direction with the result that the pattern width W31 of the section S31 increases toward the sections S32 and S33 from the center in the y-direction. The outer peripheral edges of the respective sections S32 and S33 each have a part extending in the x-direction. Thus, an increase in the pattern width per unit peripheral length from the section S34 toward the section S32 and an increase in the pattern width per unit peripheral length from the section S35 toward the section S33 are larger than an increase in the pattern width per unit peripheral length from the section S31 toward the sections S32 and S33. Similarly, the outer peripheral edge of the section S37 has a part extending in the x-direction. Thus, an increase in the pattern width per unit peripheral length from the section S34 toward the section S37 is larger than an increase in the pattern width per unit peripheral length from the section S36 toward the section S37.

Figure 6:
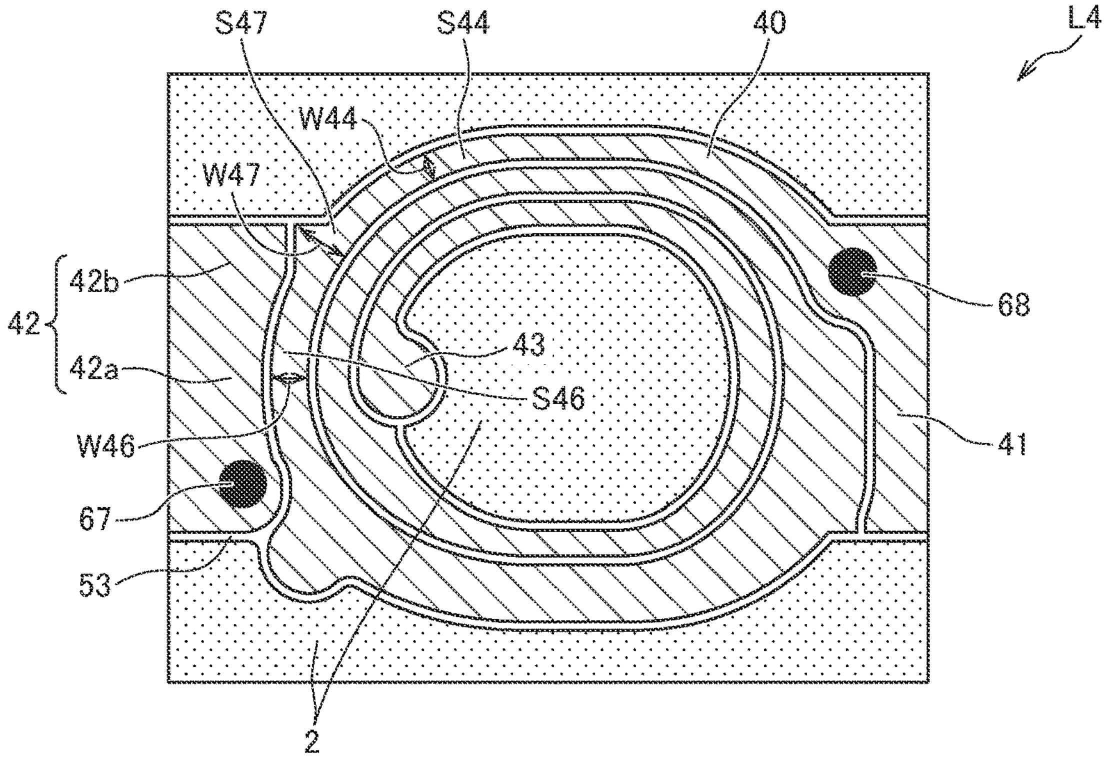
FIG. 6 is a plan view illustrating the pattern shape of the conductor layer L4.

As illustrated in FIG. 6, the conductor layer L4 is formed on the surface of the interlayer insulating film 53 and includes the coil pattern 40 and a terminal pattern 42. The terminal pattern 42 is separated from the coil pattern 40 within the surface and overlaps the terminal electrode B1 as viewed in the z-direction. The terminal pattern 42 is connected to the terminal pattern 32 through a via conductor 65 penetrating the interlayer insulating film 53. The planar position of the via conductor 65 differs from the planar position of the via conductor 63, thereby preventing a recess of the conductor layer caused due to stacking of the via conductors. Further, an inner peripheral end 43 of the coil pattern 40 is connected to the inner peripheral end 33 of the coil pattern 30 through a via conductor 66 penetrating the interlayer insulating film 53.

The terminal pattern 42 has the same shape as the terminal patterns 22 and 32 included respectively in the conductor layers L2 and L3. That is, the terminal pattern 42 includes a nonlinear part 42*a* whose pattern width in the x-direction increases with distance from the center portion in the y-direction and a linear part 42*b* positioned at one end side in the y-direction and having a substantially constant pattern width in the x-direction. The edge of the nonlinear part 42*a* positioned on the side opposite to the side surface 2*b* of the magnetic element body 2 has a circular-arc shape. On the other hand, the edge of the linear part 42*b* positioned on the side opposite to the side surface 2*b* of the magnetic element body 2 extends substantially linearly in the y-direction.

The outermost turn of the coil pattern 40 includes a section S46 provided along the nonlinear part 42*a* of the terminal pattern 42, a section S47 provided along the linear part 42*b* of the terminal pattern 42, and a section S44 positioned on the side opposite to the section S46 with respect to the section S47. The section S44 is positioned between the section S47 and an outer peripheral end 41 and includes a part extending in the x-direction. The thus configured conductor layer L4 is covered with the interlayer insulating film 54.

As illustrated in FIG. 6, the pattern width of the coil pattern 40 in the radial direction is not constant, and a pattern width W47 of the section 47 is larger than pattern widths W44 and W46 of the respective sections S44 and S46. That is, the outermost turn of the coil pattern radially protrudes outward between the sections S46 and S44. The outer peripheral edge of the section S47 includes a part extending in the x-direction. Thus, an increase in the pattern width per unit peripheral length from the section S44 toward the section S47 is larger than an increase in the pattern width per unit peripheral length from the section S46 toward the section S47.

The bump terminal electrodes B1 and B2 are provided on the interlayer insulating film 54. The terminal electrode B1 is connected to the terminal pattern 42 through a via conductor 67 penetrating the interlayer insulating film 54. The terminal electrode B2 is connected to the outer peripheral end 41 of the coil pattern 40 through a via conductor 68 penetrating the interlayer insulating film 54. The planar position of the via conductor 67 differs from the planer position of the via conductor 65, thereby preventing a recess of the conductor layer caused due to stacking of the via conductors. Further, the via conductor 68 is provided so as to partly overlap the section S32 of the coil pattern 30 for ensuring a margin upon singulation of the coil component 1 by dicing.

With the above configuration, the terminal electrode B1 is connected to the outer peripheral end 12 of the coil pattern 10 through the terminal patterns 42, 32, and 22. The outer peripheral end 12 of the coil pattern 10 and the terminal patterns 22, 32, and 42 are exposed from the side surface 2*b* of the magnetic element body 2. On the other hand, the terminal electrode B2 is connected to the outer peripheral end 41 of the coil pattern 40. The terminal patterns 11, 21, and 31 and the outer peripheral end 41 of the coil pattern 40 are exposed from the side surface 2*c* of the magnetic element body 2.

The pattern width of each of the coil patterns 10, 20, 30, and 40 is not constant but enlarged in the vicinity of the y-direction end portion of the terminal pattern to which each of the coil patterns 10, 20, 30, and 40 corresponds, thus allowing reduction of a DC resistance. In addition, the terminal patterns 11, 21, and 31 respectively have the linear parts 11*a*, 21*a*, and 31*a*, and the outer peripheral edges of the coil patterns 10, 20, and 30 adjacent respectively to the linear parts 11*a*, 21*a*, and 31*a* are substantially linear, so that, as compared to when the inner peripheral edges of the terminal patterns 11, 21, and 31 have a circular-arc shape, it is possible to ensure a sufficient pattern width for the coil patterns 10, 20, and 30. The reason why the inner peripheral edge of each of the linear parts 11*a*, 21*a*, and 31*a* is made linear is to reduce the area of each of the terminal patterns 11, 21, and 31 as much as possible while ensuring a minimum required margin in the x-direction which takes into consideration misalignment upon singulation of the coil component 1 by dicing. This can enlarge the pattern width of each of the coil patterns 10, 20, and 30 by a reduction in the area of each of the terminal patterns 11, 21, and 31. This can be achieved because the terminal patterns 11, 21, and 31 are not connected but insulated from one another to eliminate the need of providing via conductors therefor, thus facilitating a reduction in the x-direction width.

Further, the widened parts 11*b* and 11*c* provided at both ends of the linear part 11*a* in the y-direction, widened parts 21*b* and 21*c* provided at both ends of the linear part 21*a* in the y-direction, and widened parts 31*b* and 31*c* provided at both ends of the linear part 31*a* in the y-direction play a role of improving the manufacturing yield of the coil component 1 according to the present embodiment. That is, by providing such widened parts, nonlinear parts corresponding to the widened parts are included in resist patterns positioned between the coil patterns 10, 20, and 30 and terminal patterns 11, 21, and 31 upon formation of the conductor layers L1, L2, and L3 by electrolytic plating, so that flow of a plating solution used for electrolytic plating is suppressed by the nonlinear parts of the resist patterns, with the result that collapse of the resist patterns is less likely to occur.

On the other hand, the via conductors 61, 63, 65, and 67 are connected with any of the terminal patterns 22, 32, and 42, so that, considering the formation margin of the via conductors 61, 63, 65, and 67, it is necessary to ensure a larger width in the x-direction for the terminal patterns 22, 32, and 42 than for the terminal patterns 11, 21, and 31. For this reason, in place of providing the linear parts 11*a*, 21*a*, and 31*a* for the terminal patterns 11, 21, and 31, the inner peripheral edge of each of the terminal patterns 22, 32, and 42 is formed into a circular-arc shape. Even in this case, at the y-direction end portions of the terminal patterns 22, 32, and 42 where the via conductors 61, 63, 65, and 67 are not formed, the linear parts 22*b*, 32*b*, and 42*b* are formed to reduce the width in the x-direction, and correspondingly, the pattern width of each of the coil patterns 20, 30, and 40 is enlarged to thereby reduce a DC resistance.

When the above-described pattern widths W11 to W15, W21 to W27, W31 to W37, and W44, W46, W47 vary in the peripheral direction, the pattern width may be defined by the average width.

While the preferred embodiment of the present disclosure has been described, the present disclosure is not limited to the above embodiment, and various modifications may be made within the scope of the present disclosure, and all such modifications are included in the present disclosure.

For example, although the four conductor layers L1 to L4 are stacked through the interlayer insulating films in the above embodiment, the number of conductor layers to be stacked is not limited to this, and a three-layer structure or a five-or-more-layer structure may be adopted.

The technology according to the present disclosure includes the following configuration examples but not limited thereto.

A coil component according to the present disclosure includes: a coil part in which a plurality of interlayer insulating films and a plurality of conductor layers are alternately stacked; first and second terminal electrodes; and a magnetic element body in which the coil part and first and second terminal electrodes are embedded. The plurality of conductor layers include a first conductor layer positioned in the lowermost layer and a second conductor layer positioned in the uppermost layer. The first conductor layer includes a first coil pattern and a first terminal pattern provided independently of the first coil pattern and exposed from a first side surface of the magnetic element body. The second conductor layer includes a second coil pattern and a second terminal pattern provided independently of the second coil pattern and exposed from a second side surface of the magnetic element body that is positioned on the side opposite to the first side surface. The first terminal electrode is connected to one end of the first coil pattern through the second terminal pattern, and the second terminal electrode is connected to one end of the second coil pattern. The first terminal pattern includes a first linear part having a substantially constant pattern width in a first direction perpendicular to the first side surface of the magnetic element body, a first widened part positioned at one end side in a second direction along the first side surface of the magnetic element body and having a pattern width in the first direction larger than that of the first linear part, and a second widened part positioned at the other end side in the second direction and having a larger pattern width in the first direction than that of the first linear part. The outermost turn of the first coil pattern includes a first section provided along the first linear part of the first terminal pattern, a second section provided along the first widened part of the first terminal pattern, a third section provided along the second widened part of the first terminal pattern, a fourth section provided along the magnetic element body and positioned on the side opposite to the first section with respect to the second section, and a fifth section provided along the magnetic element body and positioned on the side opposite to the first section with respect to the third section. The pattern width of the first coil pattern is larger in the second and third sections than in the first, fourth, and fifth sections.

According to the present disclosure, the pattern width of the first coil pattern is locally enlarged, thereby allowing a reduction in DC resistance.

In the present disclosure, the first widened part of the first terminal pattern may have a shape in which the pattern width thereof in the first direction increases toward the one end in the second direction, and the second widened part of the first terminal pattern may have a shape in which the pattern width thereof in the first direction increases toward the other end in the second direction. This makes it possible to further enlarge the pattern width of the first coil pattern in the third and fourth sections.

In the present disclosure, the pattern width of the first coil pattern in the first section may increase toward the second and third sections from the center in the second direction. This makes it possible to further enlarge the pattern width of the first coil pattern in the first section.

In the present disclosure, the second and third sections of the first coil pattern may each have an outer peripheral edge extending in the first direction. This makes it possible to further enlarge the pattern width of the first coil pattern in the second and third sections.

In the present disclosure, the second terminal pattern may include a nonlinear part whose pattern width in the first direction increases with distance from the center portion in the second direction and a second linear part positioned at one end side in the second direction and having a substantially constant pattern width in the first direction. The outermost turn of the second coil pattern may include a sixth section provided along the nonlinear part of the second terminal pattern, a seventh section provided along the second linear part of the second terminal pattern, and an eighth section provided along the magnetic element body and positioned closer to the one end of the second coil pattern than the seventh section. The pattern width of the second coil pattern may be larger in the seventh section than in the sixth and eighth sections. Thus, the pattern width of the second coil pattern is locally enlarged, allowing a further reduction in DC resistance.

In the present disclosure, the plurality of conductor layers may further include a third conductor layer positioned between the first and second conductor layers. The third conductor layer may include a third coil pattern, a third terminal pattern exposed from the first side surface of the magnetic element body, and a fourth terminal pattern exposed from the second side surface of the magnetic element body. The first terminal electrode may be connected to the one end of the first coil pattern through the second and fourth terminal patterns. The third terminal pattern may include a third linear part having a substantially constant pattern width in the first direction, a third widened part positioned at one end side in the second direction and having a larger pattern width in the first direction than that of the third linear part, and a fourth widened part positioned at the other end side in the second direction and having a larger pattern width in the first direction than that of the third linear part. The outermost turn of the third coil pattern may include a ninth section provided along the third linear part of the third terminal pattern, a tenth section provided along the third widened part of the third terminal pattern, an eleventh section provided along the fourth widened part of the third terminal pattern, a twelfth section provided along the magnetic element body and positioned on the side opposite to the ninth section with respect to the tenth section, and a thirteenth section provided along the magnetic element body and positioned on the side opposite to the ninth section with respect to the eleventh section. The pattern width of the third coil pattern is larger in the tenth and eleventh sections than in the ninth, twelfth, and thirteenth sections. Thus, the pattern width of the third coil pattern is locally enlarged, allowing a further reduction in DC resistance.

As described above, according to the present disclosure, the pattern width of the coil pattern is locally enlarged, thus allowing a reduction in DC resistance.

What is claimed is:

1. A coil component comprising:

a coil part in which a plurality of interlayer insulating films and a plurality of conductor layers are alternately stacked;

first and second terminal electrodes; and a magnetic element body in which the coil part and first and second terminal electrodes are embedded, wherein the plurality of conductor layers include a first conductor layer positioned in a lowermost layer and a second conductor layer positioned in an uppermost layer, wherein the first conductor layer includes a first coil pattern and a first terminal pattern provided independently of the first coil pattern and exposed from a first side surface of the magnetic element body, wherein the second conductor layer includes a second coil pattern and a second terminal pattern provided independently of the second coil pattern and exposed from a second side surface of the magnetic element body that is positioned on a side opposite to the first side surface, wherein the first terminal electrode is connected to one end of the first coil pattern through the second terminal pattern, wherein the second terminal electrode is connected to one end of the second coil pattern, wherein the first terminal pattern includes a first linear part having a substantially constant pattern width in a first direction perpendicular to the first side surface of the magnetic element body, a first widened part positioned at one end side in a second direction along the first side surface of the magnetic element body and having a pattern width in the first direction larger than that of the first linear part, and a second widened part positioned at other end side in the second direction and having a larger pattern width in the first direction than that of the first linear part, wherein an outermost turn of the first coil pattern includes a first section provided along the first linear part of the first terminal pattern, a second section provided along the first widened part of the first terminal pattern, a third section provided along the second widened part of the first terminal pattern, a fourth section provided along the magnetic element body and positioned on a side opposite to the first section with respect to the second section, and a fifth section provided along the magnetic element body and positioned on a side opposite to the first section with respect to the third section, and wherein a pattern width of the first coil pattern is larger in the second and third sections than in the first, fourth, and fifth sections.

2. The coil component as claimed in claim 1, wherein the first widened part of the first terminal pattern has a shape in which a pattern width thereof in the first direction increases toward the one end in the second direction, and wherein the second widened part of the first terminal pattern has a shape in which the pattern width thereof in the first direction increases toward the other end in the second direction.

3. The coil component as claimed in claim 1, wherein a pattern width of the first coil pattern in the first section increases toward the second and third sections from a center in the second direction.

4. The coil component as claimed in claim 1, wherein each of the second and third sections of the first coil pattern has an outer peripheral edge extending in the first direction.

5. The coil component as claimed in claim 1, wherein the second terminal pattern includes a nonlinear part whose pattern width in the first direction increases with distance from the center portion in the second direction and a second linear part positioned at one end side in the second direction and having a substantially constant pattern width in the first direction, wherein an outermost turn of the second coil pattern includes a sixth section provided along the nonlinear part of the second terminal pattern, a seventh section provided along the second linear part of the second terminal pattern, and an eighth section provided along the magnetic element body and positioned closer to the one end of the second coil pattern than the seventh section, and wherein the pattern width of the second coil pattern is larger in the seventh section than in the sixth and eighth sections.

6. The coil component as claimed in claim 5, wherein the plurality of conductor layers further includes a third conductor layer positioned between the first and second conductor layers, wherein the third conductor layer includes a third coil pattern, a third terminal pattern exposed from the first side surface of the magnetic element body, and a fourth terminal pattern exposed from the second side surface of the magnetic element body, wherein the first terminal electrode is connected to the one end of the first coil pattern through the second and fourth terminal patterns, wherein the third terminal pattern includes a third linear part having a substantially constant pattern width in the first direction, a third widened part positioned at one end side in the second direction and having a larger pattern width in the first direction than that of the third linear part, and a fourth widened part positioned at other end side in the second direction and having a larger pattern width in the first direction than that of the third linear part, wherein an outermost turn of the third coil pattern includes a ninth section provided along the third linear part of the third terminal pattern, a tenth section provided along the third widened part of the third terminal pattern, an eleventh section provided along the fourth widened part of the third terminal pattern, a twelfth section provided along the magnetic element body and positioned on a side opposite to the ninth section with respect to the tenth section, and a thirteenth section provided along the magnetic element body and positioned on a side opposite to the ninth section with respect to the eleventh section, and wherein the pattern width of the third coil pattern is larger in the tenth and eleventh sections than in the ninth, twelfth, and thirteenth sections.

* * * * *